United States Patent Office 3,507,962
Patented Apr. 21, 1970

3,507,962
CONTROLLING LEAFMINER INSECTS WITH SELECTED CARBAMATE INSECTICIDES, INCLUDING 3,5-DIMETHYL-4-DIMETHYLAMINO-METHYL PHENYL-N-METHYLCARBAMATE
James L. Taylor, Gainesville, Fla., assignor to Thompson-Hayward Chemical Company, Kansas City, Kans., a corporation of Delaware
No Drawing. Continuation-in-part of abandoned application Ser. No. 565,727, July 18, 1966. This application May 9, 1969, Ser. No. 823,501
Int. Cl. A01n 9/00, 17/00, 17/08
U.S. Cl. 424—300                     5 Claims

ABSTRACT OF THE DISCLOSURE

A method of controlling insects of the order, Diptera, by contacting said insects with a pesticidally effective amount of a compound of the formula

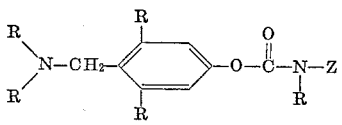

wherein R is alkyl and Z is hydrogen or alkyl.

---

This application is a continuation in part of a previous application Ser. No. 565,727, filed July 18, 1966, now abandoned.

This invention relates to a novel method of controlling pestiferous organisms. More particularly, this invention relates to and has its object a novel method of controlling certain pestiferous insects, and to novel compositions for obtaining this object.

It has been previously known that insects of the order Diptera, family Agromyzidae, commonly known as leafminer insects could be controlled, but only with difficulty, by the application thereagainst of substantial amounts of pesticidal products. Wolfenbarger et al., in vol. 46, No. 3 of The Florida Entomologist, pages 251–265 (1963), reported on the effectiveness of certain pesticidal materials in the control of the leafminer insect *Liriomyza munda* (Frick). In this publication it is demonstrated that this leafminer insect could be controlled by application of the pesticides set forth in Table 1 below:

TABLE I

| Pesticide | Rate (lbs./acre) | Percent control |
|---|---|---|
| Parathion | 0.5 | 98 |
| Delnav | 0.5 | 93 |
| Diazinon | 0.5 | 99 |
| Dimethoate | 0.25 | 99 |
| Dylox* | 2.0 | 93 |
| Bayer 39007* | 1.5 | 99 |
| Bayer 29493* | 0.75 | 98 |
| Ethion | 0.25 | 66 |

* Estimated.

This demonstrates that only by application of substantial amounts of these pesticides can any effective degree of control be obtained. In addition, Wolfenbarger et al. clearly teach on page 264, that, carbamate insecticides do not appear to be effective leafminer controlling agents.

It has now been discovered that contrary to the above noted publication, leafminer insects can be effectively controlled. It has been discovered that these pestiferous insects may be effectively controlled by being contacted with a small but effective amount of an insecticidal compound of the Formula I:

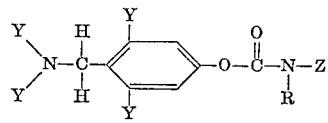

wherein each Y and R may be the same or different and is lower alkyl (e.g. methyl or ethyl); and Z is selected from the group consisting of hydrogen and lower alkyl (e.g. methyl or ethyl). Most satisfactory results have been obtained wherein each Y is methyl; R is lower alkyl (e.g. methyl or ethyl); and Z is hydrogen. Even more specifically, the most preferred compound has been found to be 3,5-dimethyl-4-dimethyl aminoethyl phenyl-N-methyl carbamate; although the other compounds also provide satisfactory results.

In the practice of this invention, very satisfactory results have been obtained where compositions of this invention comprise a small but effective amount of the principal active ingredients of this invention (i.e. the compounds of Formula I), effectively dispersed in a substantial amount of a suitable extending agent. In this disclosure and in the claims appended thereto, the term, "dispersed" is used in its widest possible sense. When it is said that the compounds of this invention are dispersed, it means that the particles may be molecular in size and held in true solution in a suitable solvent. It means further, that the particles may be colloidal in size and dispersed through a liquid phase in the form of suspensions or emulsions or in the form of particles held in suspension by wetting agents. It also includes particles which are dispersed in a semi-solid viscous carrier, such as petrolatum or soap, in which they may be actually dissolved in the carrier or held in suspension in the carrier with the aid of suitable emulsifying or wetting agents. The term "dispersed" also means that the particles may be mixed with and spread throughout a solid carrier so that the mixture is in the form of powder or dust. The term "dispersed" also includes mixtures which are suitable for use as aerosols, including solutions, suspensions or emulsions of the agents of this invention in a carrier, such as xylene or water, with a propellant such as Freon which boils below room temperature at ordinary pressure.

The term "extending agent" as used in this disclosure and in the appended claims, includes any and all of those agents in which the compounds of the instant invention are dispersed. It includes, therefore, the solvents of a true solution, the liquid phase of suspensions, emulsions or aerosols, the semi-solid carrier of ointments and the solid phase of dusts, granules, and powders.

It has been found that the compounds of this invention are active when dispersed in an extending agent at concentrations of 0.001% by weight or even lower. This concentration is effective when the dispersing agent is a liquid, but it is preferred to use more concentrated mixtures when the dispersing agent is a semi-solid or a solid. This is because liquid dispersions which are, of course, suitable for use as sprays give a more intimate contact with the pests than the solid dispersions and, therefore, lower concentrations are more effective with liquid dispersions.

There are a number of solvents which can be utilized for the preparation of solutions, suspensions or emulsions of the compounds of this invention. High boiling oils of vegetable origin, such as castor oil or olive oil, have been found to be suitable. Low boiling, more volatile solvents, such as acetone, alcohols (such as methanol and ethanol), benzene, toluene and the like are also useful. Xylene and heavy aromatic naphtha are particularly desirable as solvents. For certain applications is may be advantageous to resort to mixtures of solvents.

If the active agents are to be applied as aerosols, it is convenient to dissolve them in a suitable solvent and to disperse the resulting solution in a liquid such as Freon, which boils below room temperature. For such applications it is better to employ true solutions of the active agent; although, it is possible to employ suspensions or emulsions of the active agent.

The agents of this invention are often dispersed either in the form of emulsions or suspensions, in an inert carrier with the aid of a surface-active substance. Such surface-active substances may be anion-active, cation-active or non-ionizing. There may be mentioned by way of example, natural or synthetic soaps, Turkey-red oil, calcium alkylaryl sulfonates, fatty alcohol sulfonates, esters of fatty acids and the like. Other examples include high molecular weight quaternary ammonium compounds, as well as condensation products of ethylene and propylene oxide with monohydric and polyhydric alcohols or alkyl phenols.

For use as a powder or dust the active ingredients of this invention may be mixed with any of a number of extending agents either organic or inorganic in nature which are suitable for the manufacture of pulverulent preparations. In addition to mixing the ingredients directly the active compounds of this invention may first be dissolved in a suitable solvent and the dry extending agents may be treated with the resulting solution so that after the solvent evaporates off the active ingredient is effectively coated on the surface of the extending agent. The extending agents which may be employed include, for example, tricalcium phosphate, calcium carbonate, attapulgite, kaolin, bole, kieselguhr, montmorillonite, talc, calcinated magnesia and others. Materials of vegetable origin such as powdered cork, powdered wood and powdered walnut shells are also useful. These mixtures may be used in the dry form or, by the addition of wetting agents, the dry powder can be rendered wettable by water so as to obtain stable aqueous dispersions suitable for use as sprays.

It has been found that most satisfactory results are obtained in the practice of this invention, when the active ingredient of the invention is present in the compositions of this invention in an amount of from 0.001% to 5.00% by weight of the final composition, and optimally, in an amount of from 0.002% to 2.00% by weight of the final composition applied against the pestiferous insects of this invention.

The final compositions may be employed and applied against the pestiferous insects sought to be controlled, in any manner known to the art. Thus, they may be employed on or near the vegetation sought to be protected, or directly on the insects to be controlled, provided eventual contact with the pestiferous insect controlled by the practice of this invention is made.

Among the pestiferous insects which may be controlled by the practice of this invention, may be included such leafminer insects as, *Phytomyza atricornis, Phytomyza delphiniae, Phytomyza ilicola, Phytomyza ilicis, Phytomyza miniscula, Liriomyza brassicae, Liriomyza bryoniae,* and *Melang omyza simplex,* among other like leafminer insects.

The compounds of this invention may be prepared by the process of this invention, which entails a number of steps beginning with a compound of Formula II as the starting material:

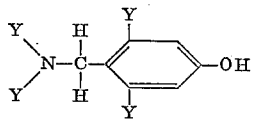

wherein Y is an hereinbefore defined. In the first step of the process of this invention, the starting material is reacted with an alkylisocyanate, for example methyl isocyanate or ethylisocyanate; or alkylcarbamic acid halide, for example monoalkyl carbamic acid halide (e.g. methyl carbamic acid chloride, or ethyl carbamic acid chloride) or dialkyl carbamic acid halide (e.g. dimethyl carbamic acid chloride or diethyl carbamic acid chloride), under conditions well known to the art, to yield the desired active ingredient of this invention. In the preferred embodiments of this invention, the alkylisocyanate is methyl isocyanate and the alkyl carbamic acid halide is monomethyl carbamic acid chloride.

The invention may be further illustrated by the following examples:

EXAMPLE 1

3,5-dimethyl-4-dimethyl aminomethylphenyl-N-methyl carbamate (A) 3,5-dimethyl-4-dimethyl aminomethyl phenol.—A solution of 68 grams of 3,5-dimethylanisol in 125 ml. of benzene and 125 ml. of concentrated hydrochloric acid is saturated with gaseous HCl at 5° C. After two hours and with vigorous stirring, a solution of 15 grams of paraformaldehyde in 225 ml. of concentrated hydrochloric acid is added dropwise. During the addition and for one hour thereafter the temperature is kept at +4 to +8° C. while a weak stream of HCl-gas is bubbled through. Then 100 ml. of benzene and 200 grams of ice are added to the reaction mixture, the organic layer is separated and washed 3 times with 100 ml. of cold water, and the benzene layer is dried on $Na_2SO_4$ and then filtered. The filtrate is added to a solution of 50 grams of dimethylamine in 250 ml. of benzene and left to stand at room temperature for 24 hours after which it is heated at 40–50° C. for three hours. The excess of dimethylamine and the benzene are distilled off at normal pressure. Then 250 ml. of benzene are added to the residue, which is extracted with 4 N hydrochloric acid, and the water layer is separated and then made strongly alkaline with a concentrated NaOH-solution, and then extracted with ether. The ether solution is dried on $Na_2SO_4$ after which the solvent is distilled off and the residue is further distilled at reduced pressure to yield 3,5-dimethyl-4-dimethylaminomethyl anisol.

Next 27 grams of 3,5-dimethyl-4-dimethylaminomethyl-anisol in 110 ml. of 48% HBr is refluxed for 10 hours. The solution is evaporated to dryness in vacuum after which 50 ml. of water are added. The solution is then rendered strongly alkaline by the addition of 60 ml. of 4 N NaOH, and extracted two times with 100 ml. of ether, and then continuously extracted with ether evaporation of this ether extract and crystallization of the residue from benzene-petroleum ether 1:1 yields 15 grams of 3,5-dimethyl-4-dimethylaminomethylphenol.

(B) 3,5-dimethyl-4-dimethyl aminomethyl phenyl-N-methyl carbamate.—To a solution of 36 grams of 3,5-dimethyl-4-dimethylaminomethylphenol in 100 ml. of dry diethylether are added a few drops of triethylamine and 12.5 grams of methylisocyanate and the mixture is held at room temperature for 24 hours. The ether is then removed by distillation and the residue recrystallized from petroleum ether, to yield 3,5-dimethyl-4-dimethylaminomethylphenyl-N-methylcarbamate.

EXAMPLE 2

A water dispersible powder containing 25% by weight of active ingredient is prepared by intimately mixing 250 grams of 3,5-dimethyl-4-dimethylaminomethylphenyl-N-methyl carbamate, 400 grams of attapulgite, 250 grams of kaolinite, 70 grams of sodium lignosulfonate, and 30 grams of sodium oleyl N-methyltaurate. The resulting premix is ground through a mill, such as a hammer mill. This powder may be mixed with water to form dispersions of the desired active ingredient content.

EXAMPLE 3

A water emulsifiable liquid concentrate containing 10% by weight of active ingredient is prepared by dissolving 100 lbs. of 3,5-dimethyl-4-dimethylaminomethylphenyl-N-methyl carbamate, 25 lbs. of calcium dodecylbenzene sulfonate, and 25 lbs. of alkylaryl polyether alcohol in 117 gallons of xylene. The mixture is agitated until a homogenous solution is obtained. The resulting solution may be mixed with water in the required proportions for application against the leafminer insects.

EXAMPLE 4

Cowpea seedlings whose leaves were infested with leafminer (*Liriomyza munda* Frick) were treated with aqueous compositions containing various concentrations of the test compounds, 3,5-dimethyl-4-dimethylaminomethylphenyl-N-methyl carbamate, which compositions were prepared by diluting emulsion concentrates of the test compound with water. Observations were made to determine the percent reduction in numbers of larvae emerging from the leaves to pupate. The results obtained are set forth in Table 2 below.

TABLE 2

| Concentration of test compound composition* (percent) | Percent larvae reduction |
|---|---|
| 0.24 | 100 |
| 0.06 | 100 |
| 0.015 | 100 |
| 0.0075 | 100 |
| 0.0038 | 100 |
| 0.0019 | 63 |

*Upon dilution and application at the rate of 27 or 64 gallons per acre, the compositions will result in the following amounts of test compound being applied per acre:

| | Equivalent pounds/acre | |
|---|---|---|
| Percent concentration | 27 gallons | 67 gallons |
| 0.24 | 0.54 | 1.30 |
| 0.06 | 0.14 | 0.33 |
| 0.015 | 0.035 | 0.08 |
| 0.0075 | 0.018 | 0.04 |
| 0.0038 | 0.009 | 0.02 |

What is claimed is:

1. In the art of controlling leafminer insects of the order Diptera, the improvement which consists of the step of causing said leafminer insects to be contacted with a small but insecticidally effective amount of a compound of the formula:

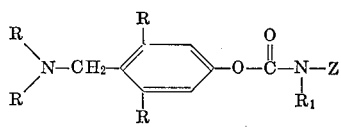

wherein each R and $R_1$ is lower alkyl, and Z is selected from the group consisting of hydrogen and lower alkyl.

2. The improvement of claim 1, wherein $R_1$ is lower alkyl; Z is hydrogen and each R is methyl.

3. The improvement of claim 1, wherein a small but effective amount of the compound is dispersed in a substantial amount of a suitable extending agent.

4. The improvement of claim 1, wherein Z is hydrogen, and R and $R_1$ are each methyl.

5. The improvement of claim 1, wherein the leafminer insect is *Phytomyza atricornis, Phytomyza delphiniae, Phytomyza ilicicola, Phytomyza ilicis, Phytomyza miniscula, Liriomyza brassicae, Liriomyza bryoniae, Liriomyza munda,* or *Menangromyza simplex.*

References Cited

UNITED STATES PATENTS 3,388,151    6/1968    Welle et al.

OTHER REFERENCES

Wolfenbarger et al., The Florida Entomologist 46(3): 251–265 (1963).

SHEP K. ROSE, Primary Examiner